D. W. SARTAIN.
SPRING WHEEL.
APPLICATION FILED MAR. 11, 1914.
1,119,645.
Patented Dec. 1, 1914.
2 SHEETS—SHEET 2.
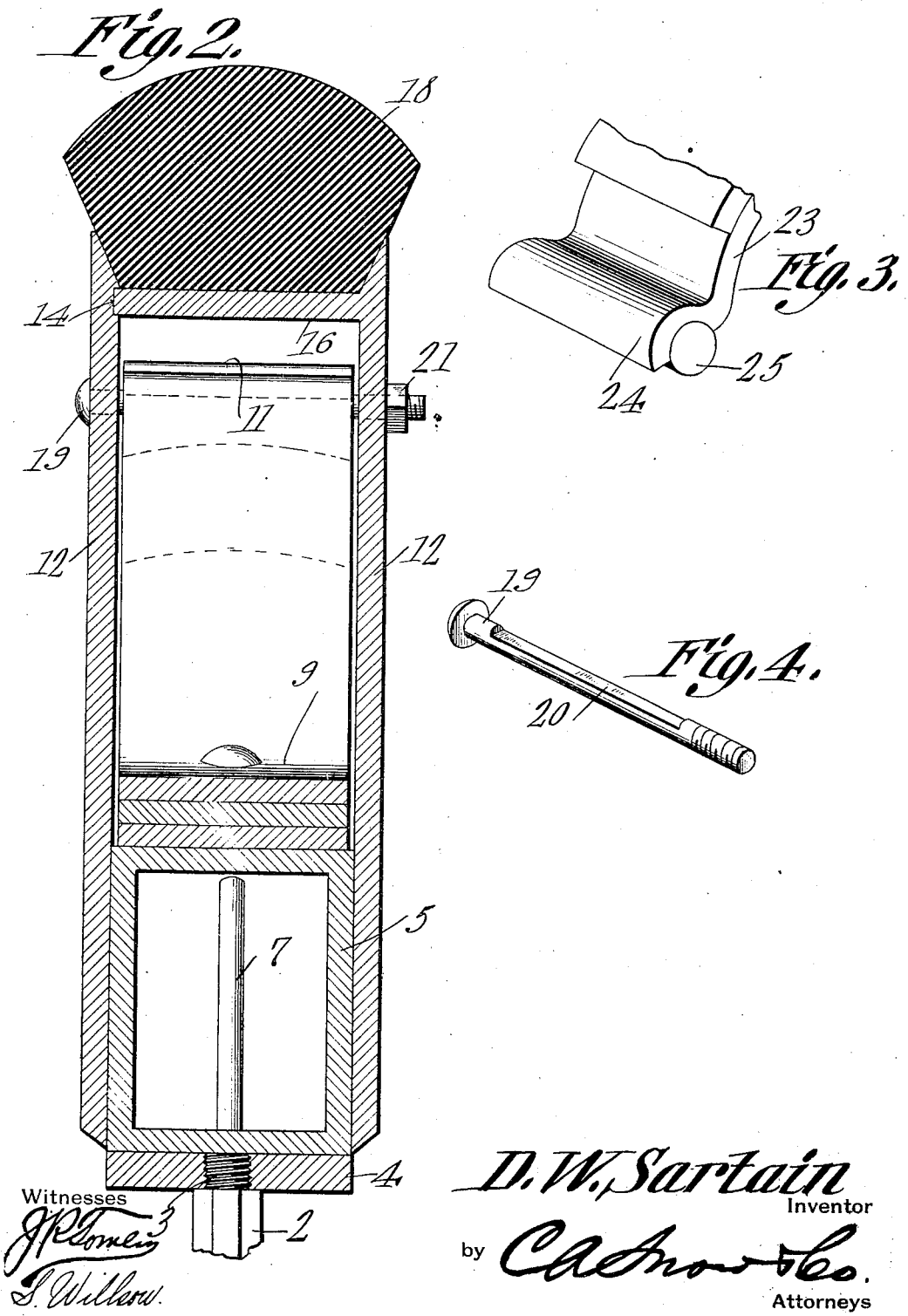
D. W. Sartain
Inventor
Witnesses
by
Attorneys

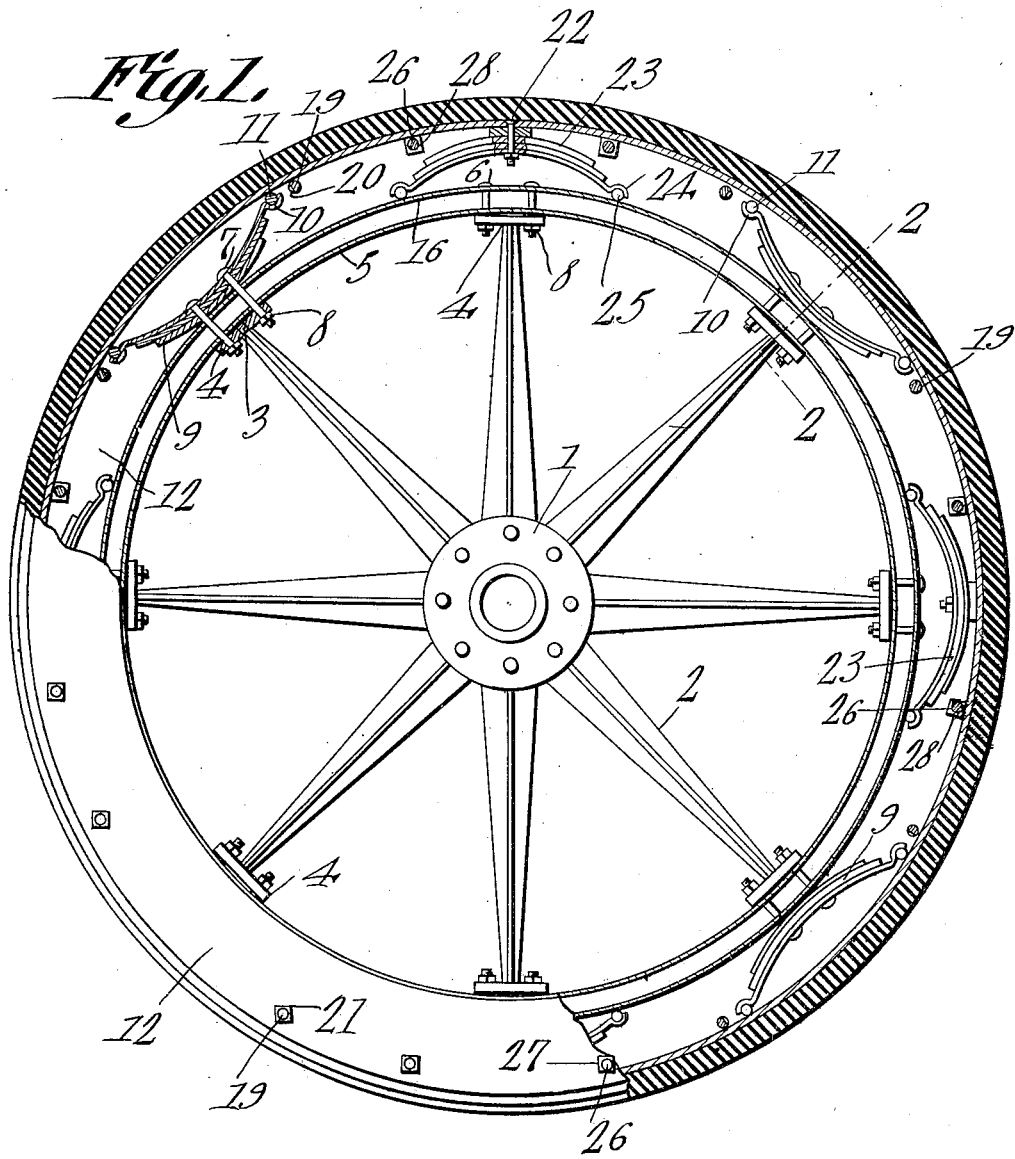

UNITED STATES PATENT OFFICE.

DEMOCKRATUS WASHINGTON SARTAIN, OF COALMONT, TENNESSEE.

SPRING-WHEEL.

1,119,645.　　　　Specification of Letters Patent.　　Patented Dec. 1, 1914.

Application filed March 11, 1914. Serial No. 823,994.

*To all whom it may concern:*

Be it known that I, DEMOCKRATUS WASHINGTON SARTAIN, a citizen of the United States, residing at Coalmont, in the county of Grundy and State of Tennessee, have invented a new and useful Spring-Wheel, of which the following is a specification.

The device forming the subject matter of this application is a spring wheel of that general type in which inflatable pneumatic elements are replaced by springs, and one object of the present invention is to provide a spring wheel structure which cannot be damaged by puncture.

Another object of the invention is to provide a novel arrangement of springs which are interposed between the inner and outer rims.

The invention aims to provide novel means whereby the springs of each rim may have a slidable, anti-friction bearing upon the other rim.

One object of this invention is to provide, in a device of the type hereinafter described, novel means for limiting the creeping of the outer rim upon the inner rim.

It is within the province of the invention to improve generally and to enhance the utility of, devices of that type to which the structure herein disclosed appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows in sectional side elevation, a spring wheel constructed in accordance with the present invention; Fig. 2 is a transverse section taken upon the line 2—2 of Fig. 1; Fig. 3 is a perspective view illustrating a portion of one of the springs together with the antifriction bearing thereon; Fig. 4 is a perspective view of one of the top bolts.

The structure forming the subject matter of this application comprises a hub 1 to which are secured spokes 2. The spokes 2 preferably are rigid and since a spring wheel cannot be characterized patentably by any specific form of rigid spokes, the spokes need not be described in detail. At their outer ends, the spokes 2 are threaded as indicated at 3 in Figs. 2 and are engaged with supports 4 preferably taking the form of short plates. The supports 4 sustain an inner rim 5 which, as shown to best advantage in Fig. 2 is a tubular structure of rectangular transverse configuration. Bolts 6 and 7 pass through the inner rim 5 and through the supports 4, the bolts carrying nuts 8 which bear against the supports. The bolts 6 engage at their outer or headed ends directly with the inner rim 5, but the bolts 7 are somewhat longer than the bolts 6, to the end that they may pass through and hold upon the inner rim 5, springs 9 of bowed form and extended circumferentially of the inner rim 5. The springs 9 may if desired consist of a plurality of laminæ. Adjacent their ends, the springs 9 are provided with seats 10 in which are journaled for rotation, antifriction elements, such as rollers 11. The springs 9 and the rollers 11 may be described as arched, resilient structures. Any desired number of these arched resilient structures may be provided.

The invention further includes an outer rim, which is a composite structure, the same including side plates 12 one of which is provided in its inner face with a circumferential groove 14. The groove 14 receives one edge of a tread 16 which may be denominated the body portion of the outer rim, the tread 16 being formed integrally with the other side plate 12. In the channel defined by the outer edges of the side plates 12 and the tread or body 16 is located a tire 18 which may be of any desired construction, a solid tire being preferred.

The side plates 12 of the outer rim extend inwardly and the inner rim 5 fits closely but slidably between the side plates. The side plates 12 are held together by bolts 19, one of which is shown in detail in Fig. 4. These bolts 19 are located relatively near to the ends of the springs 9 and the bolts are flattened intermediate their ends, as shown at 20, the flattened sides of the bolts being presented toward the ends of the springs 9. The rollers 11 which are carried by the ends of the springs 9 ride upon the intrados of the tread portion 16 of the outer rim and the springs yield under pressure. Ultimately, however, the ends of the springs 9 come into contact with the flat sides 20 of the bolts 19. By this operation, the springs 9 are stiffened and, at the same time, a creeping of the outer rim upon the inner rim 5 is limited, the bolts 19, therefore, constituting stops engaging the ends of the springs 9 and constitute also, means whereby a creeping of the outer rim upon the inner rim is prevented. Nuts 21 are applied to the threaded ends of the bolts 19 and engage one of the side plates 12.

By means of securing elements 22, bowed springs 23, resembling the springs 9, are secured to the outer rim, or, more specifically to the tread 16, these springs 23 being equipped adjacent their ends with transverse seats 24 receiving anti-friction rollers 25 which ride upon the extrados of the inner rim 5.

The side plates 12 may be connected by bolts 26, each of which is provided with an external nut 27. If desired, the bolts 26 may carry internal nuts 28 which bear upon the adjacent faces of the side plates 12. These nuts 28 act as shoulders which prevent the side plates 12 from being pinched so closely together by the bolts 19 as to bind upon the inner rim 5.

In practical operation, when the springs 9 and 23 are compressed, the ends of the springs 9 will ride upon the tread 16 and the ends of the springs 23 will ride upon the inner rim 5, circumferentially of the wheel, as will be understood readily when Fig. 1 is noted, the anti-friction elements 25 and 11 facilitating the movements of the ends of the springs. The ends of the springs 9 come into abutment with the flat sides 20 of the stop bolts 19, thus, at once, tending to stiffen up the springs under an excessive load and to prevent creeping.

Having thus described the invention, what is claimed is:—

1. In a device of the class described, an inner rim; an outer rim comprising a tread and side plates; one side plate being removable; an arched spring secured in its intermediate portion to the inner rim and having its ends mounted to slide upon the tread; and unitary securing devices terminally mounted in both side plates, the ends of the springs being spaced normally from the securing devices and being adapted to engage therewith when the spring yields, the securing devices being in alinement with the end faces of the spring thereby to effect a positive abutment after spring has yielded to an extent sufficient to bring the ends thereof into contact with the securing devices.

2. In a device of the class described, an inner rim; an outer rim comprising a tread and side plates, one side plate being removable; an arched spring secured in its intermediate portion to the inner rim and having its ends mounted to slide upon the tread; bolts terminally mounted in both side plates, the bolts having flat side faces, the ends of the spring being spaced normally from the flattened side faces of the bolts and being adapted to engage therewith when the spring yields, and the flat side faces of the bolts being in alinement with the end faces of the spring thereby to effect a positive abutment after the spring has yielded to an extent sufficient to bring the ends thereof into engagement with the bolts.

In testimony that I claim the foregoing as my own, I have hereto affixed my signature in the presence of two witnesses.

Demockratus Washington Sartain.

DEMOCKRATUS WASHINGTON SARTAIN.

Witnesses:
 Thos. M. Lockhart,
 Lillard T. Conry.